Oct. 16, 1962
D. H. CLEMENS ET AL
PROCESS OF PRODUCING ALKYLATED POLYMETHYLOL
AMINOPLAST CONDENSATES
Filed Nov. 18, 1958
3,059,027
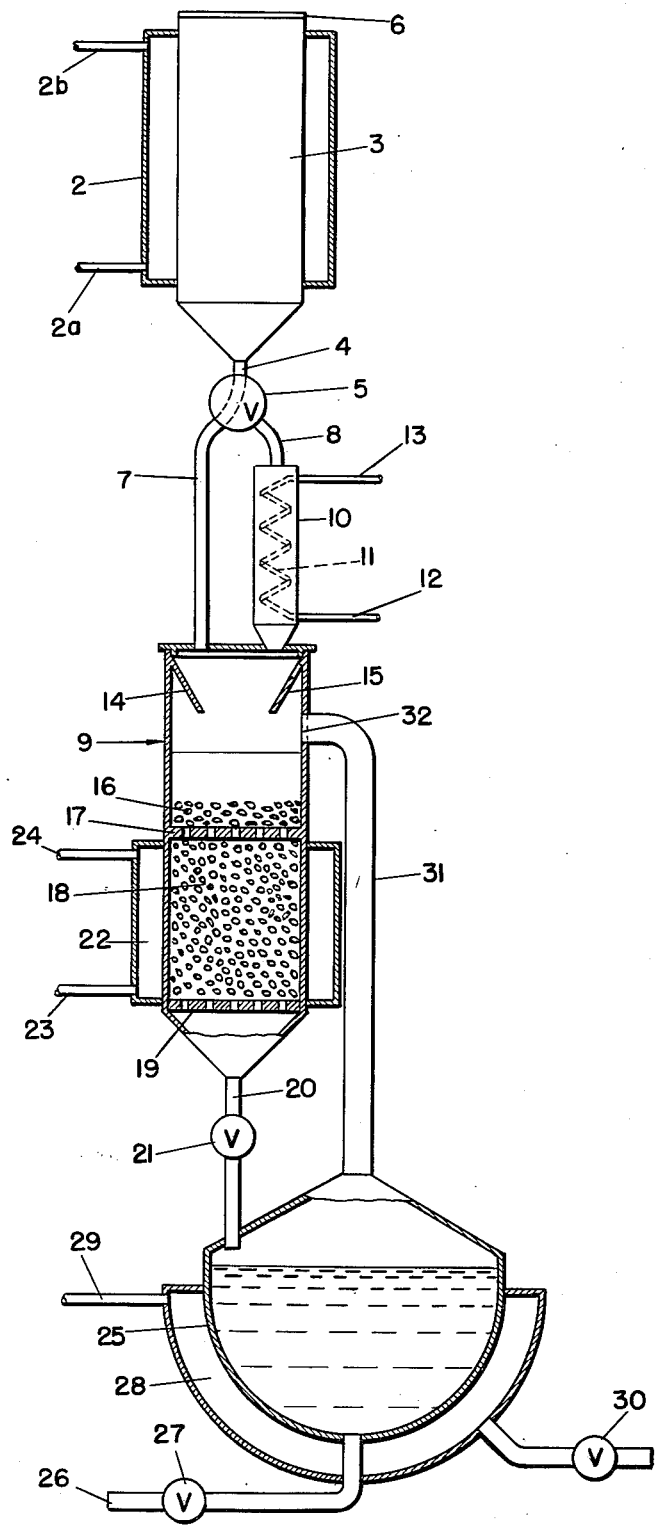

3,059,027
PROCESS OF PRODUCING ALKYLATED POLY-
METHYLOL AMINOPLAST CONDENSATES
David H. Clemens, Willow Grove, and William D. Emmons, Huntingdon Valley, Pa., assignors to Rohm & Haas Company, Philadelphia, Pa., a corporation of Delaware
Filed Nov. 18, 1958, Ser. No. 774,657
1 Claim. (Cl. 260—553)

This invention relates to the production of alkylated polymethylol aminoplast condensates, particularly those of urea, N,N'-ethyleneurea, and aminotriazines. It is particularly concerned with an improved method for the production of such condensates involving the performance of the alkylation step in the presence of a cation-exchange resin as a catalyst.

In the production of condensates of the type just mentioned in accordance with conventional practice, there may be introduced into the nitrogen-containing compound, that is the urea or the aminotriazine, a plurality of methylol groups averaging from 2 to 6 thereof per molecule of nitrogen-containing compound. After the introduction of the methylol groups, the condensate is alkylated by means of an alcohol having from 1 to 4 carbon atoms, the particular alcohol selected depending upon the solubility characteristics desired in the alkylated condensate. For example, if solubility or dispersibility in aqueous media is desired, the alcohol is usually methanol and sometimes ethanol; or if solubility in higher alcohols or mixtures thereof with hydrocarbon solvents including toluene, benzene, and xylene is desired, a higher alcohol having from 2 to 4 carbon atoms such as n-butanol is generally preferred. Besides imparting a desired solubility or compatibility of the alkylated condensates, the alkylation is generally of advantage in providing a greater stability of the aminoplast. The alkylated condensates generally have a greater shelf-life than the unalkylated condensates under normal storage conditions.

The normal procedures of producing the alkylated polymethylol condensates generally involve the preliminary preparation of the polymethylol urea or the like by reaction of formaldehyde with the urea or other nitrogen compound under alkaline conditions. Thereafter, the reaction medium containing the polymethylol condensate is rendered acid and if necessary, the alcohol needed for the alkylation is introduced.

In this general procedure, when aminotriazine condensates are being produced, especially those from melamine, it is difficult to obtain high yields without severe losses caused by the simultaneous condensation or polymerization of the polymethylol compound during the alkylation reaction. The insolubilized condensation polymer must, of course, be removed from the reaction product and this involves a corresponding loss of materials. Careful control of various conditions can sometimes be resorted to with reasonable success in reducing the amount of loss of this condensation polymerizate. However, there are situations where the conditions required to reduce the loss to a practical extent are so stringent as to make the procedure impractical. For example, in many cases there must be a large excess of the alcohol, as much as 30 moles thereof per mole of polymethylol aminoplast, to prevent formation of insoluble gels; this results in the production of extremely dilute products which are difficult or expensive to concentrate because of the tendency to form insoluble gels during distillation in the presence of the acid catalyst. This is particularly objectionable when alkylation of a polymethylol melamine containing a relatively low proportion of formaldehyde on the order of about 3 methylol units per melamine molecule is desired.

The process of the present invention provides an efficient way of producing alkylated polymethylol aminoplast condensates which have low molecular weight, low viscosity, and a high degree of compatibility with other film-forming materials. The low molecular weight and low viscosity make it possible to employ the condensates in the form of solutions having high solids contents. In accordance with the present invention, also, an improved process of alkylation of a polymethylol aminotriazine is provided wherein the alkylation can be effected without loss of substantial amounts of the starting materials through insolubilization as a result of condensation polymerization during alkylation of the polymethylol aminotriazine.

In accordance with the present invention, a relatively small total amount of alcohol is used but the reaction is effected in the presence of an ion-exchange resin as a catalyst. The polymethylol condensate and the alcohol are continuously passed to the ion-exchange resin in a mixture in which the relative proportions of the two reactants may have any ratio desired such as an 8:1 to 35:1 or higher mole ratio of alcohol:polymethylol condensate in spite of the fact that the total amount of alcohol used is relatively small as compared to the total amount of polymethylol compound to be alkylated. After leaving the reaction zone, the solution in the alcohol of the alkylated condensate is subjected to heat to distill off excess alcohol which is recycled to the reaction zone. Additional polymethylol condensate is mixed with the alcohol in the proper proportion to provide the desired mole ratio between the two in the reaction zone and the mixture is continuously fed to the reaction zone.

In general, alkylated polymethylol aminoplasts may be prepared in accordance with the invention from any polymethylolated urea, N,N'-ethyleneurea, or aminotriazine, such as dimethylolurea, trimethylolurea, tetramethylolurea, dimethylol-N,N'-ethyleneurea, trimethylolmelamine, pentamethylolmelamine, and the like, which is essentially uncondensed. These compounds can be any of those available commercially or they can be made by condensing formaldehyde with urea, N,N'-ethyleneurea, or an aminotriazine either in an essentially aqueous system or in a substantially anhydrous solvent comprising an alcohol. This latter medium may contain from about 1 to 15% of water, but preferably contains less than 5% thereof. A small amount of water is, of course, necessary to assure reaction of the formaldehyde with the nitrogenous compound. Besides alcohol, the solvent may comprise inert components, such as xylenes, benzene, toluene, and the like, if desired.

The polymethylol aminoplast may or may not be of water-soluble character. The polymethylolureas and some polymethylol aminotriazines are water-soluble, but some of the polymethylol aminoplasts are not, but are soluble in the alcohol with which they are to be alkylated.

Formaldehyde may be used as such or it may be derived from a polymer thereof such as paraformaldehyde or any other source of formaldehyde may be used. Advantageously, when a polymer is used, it may be introduced into water or into the same alcohol as is to be used in alkylation and dissolved by heating therein after rendering the medium alkaline, such as a pH of 7.5 to 11 and, in the case of an aminotriazine, about 8.5 to 10.5, preferably 9 to 10. Generally, the proportion of formaldehyde may be from 15 to 75 parts by weight thereof in 100 parts by weight of the mixture thereof with water or alcohol. Alkalinity may be imparted by introducing a small amount of sodium hydroxide or other alkali metal hydroxide, ammonia, a quaternary ammonium compound such as benzyltrimethyl ammonium hydroxide, or an amine such as dimethylamine, trimethylamine, diethylamine, triethylamine, triethanolamine, diethanolamine, 2-amino-propanol-1, and the like. One of the advantages of the present invention is the fact that caustic soda or potash may be employed for this purpose without trouble since the ion-exchange resin removes the alkali metal ions which are thereby prevented from remaining in the product wherein they would tend to impart sensitivity to moisture in coatings or molded articles prepared from the condensate.

When paraformaldehyde is employed, the mixture thereof with the water or alcohol, after being rendered alkaline as mentioned above, may be heated for a short time such as about 10 to 15 minutes for the purpose of degrading the formaldehyde into a form soluble in the water or alcohol. Thereafter, the nitrogen compound (urea, N,N'-ethyleneurea, or aminotriazine) is charged and the mixture is heated to a temperature of 50° C. to 125° C., preferably to reflux, to effect reaction of formaldehyde with the nitrogen compound. The time of this period of reaction depends upon whether water or alcohol is used, the particular alcohol used which controls the temperature of reflux, and the particular nitrogen compound and generally may be from about 20 minutes to 3 hours. For example, about 2 hours suffices to convert melamine into trimethylol melamine in the presence of methanol which refluxes at about 75° C. If a lesser or greater amount of methylol units is to be introduced into the polymethylol aminoplasts, a proportionately lesser or greater time may be necessary.

In making a urea-formaldehyde condensate, there may be used a typical system in which one mole of urea is heated with about four moles of aqueous 37% formaldehyde for about one hour under alkaline conditions. Then the product is heated under reduced pressure to distill or strip off water to leave a solid concentration of at least about 50%, such as 60 to 90%.

The proportion of nitrogen compound introduced may be such as to provide a mole ratio of about 2 to 9 moles of formaldehyde per mole of nitrogen compound. In the making of a trimethylol melamine, the proportion of melamine is such as to provide from about 3.2 to 3.7, and preferably 3.5 moles of formaldehyde per mole of melamine. In the making of a polymethylol urea or polymethylol N,N'-ethyleneureas, the mole ratio may be from about 2 to 6, preferably about 4, of formaldehyde per mole of urea.

If the polymethylol condensate has been prepared in water, the product may be used as the starting material for the alkylation process of the present invention if it contains from about 5 to 50% water. If more water than this is present, it is preferably removed to bring the content of water in polymethylol condensation product within this range. A preferred product is one which contains no more than about 12 to 18% by weight of water. If the polymethylol condensate has been prepared in an alcoholic medium, it may be used directly for the alkylation process of the present invention since it will ordinarily contain not over about 14% by weight of water and the ratio of alcohol to polymethylol condensate will ordinarily not exceed 7:1.

For the alkylation process of the present invention, a cation-exchange resin in particulate or granular form is introduced into a reaction vessel, such as a column inclined to the horizontal, to facilitate gravity flow of the reactants therethrough. The polymethylol condensate is fed along with alcohol through the ion-exchange resin. The product discharged from the ion-exchange resin, which is the alkylated polymethylol aminoplast, is received within a vessel which is heated to distill off alcohol. The alcohol distilled off is recycled to the stream of polymethylol aminoplast and serves as the reactant in the alkylation zone. The rate at which the polymethylol aminoplast is fed to the reaction zone within the mass of ion-exchange resin is controlled so that the proportion of alcohol distilled from the product which is recycled to be mixed with the polymethylol aminoplast is present in the desired mole ratio relative to the polymethylol aminoplast. This mole ratio may vary depending upon the particular nitrogen-containing compound whose alkylated polymethylol condensate is to be formed. Thus, in the making of an alkylated polymethylol urea, the polymethylol urea that is fed may be one which is formed of a 4:1 formaldehyde-urea mole ratio and which contains about 14% water. If methanol is employed, a proportion of about 5 moles thereof, for each mole of the polymethylol urea that is to be reacted in the system, may be disposed in the product-receiving vessel in which the alcohol is to be distilled for recycling. The rate of flow of the polymethylol urea is adjusted so that the rate of flow of condensed alcohol that is mixed with the polymethylol aminoplast condensate provides the desired high mole ratio such as from 8:1 to 35:1 between the alcohol and the polymethylol aminoplast. This mixture with the desired mole ratio between the reactants is continuously formed and fed downwardly through the ion-exchange resin where alkylation occurs. The alkylated product flows out of the ion-exchange resin into the zone where the alcohol can be distilled in the absence of the catalyst so that little or no further condensation of the alkylated polymethylol condensate occurs therein.

To absorb any acid that may develop because of degradation of the cation-exchange resin in the column, an anion-exchange resin may be mixed within the column of cation-exchange resin or placed in a separate zone of the column immediately below the main body of cation-exchange resin. The amount of anion-exchange resin needed is relatively small, the ratio of cation-exchange to anion-exchange resin being from 100:1 to 2:1. Alternatively, a high-boiling amine may be placed in the pot to react with and thereby neutralize any acid introduced into the system by degradation of the cation-exchange resin. Examples include triethanolamine and cetyldimethylamine.

The continuous distillation and re-use or recycling of the alcohol from the alkylated product and the controlled flow of the polymethylol condensate makes it possible to provide an efficient system for producing the alkylated polymethylol condensates. By using the present process, no water-soluble alkali metal salts remain in the alkylation product. The process avoids the production of water-soluble alkali metal salts that are ordinarily produced upon the neutralization of acid catalysts employed during alkylation procedures. The process makes efficient use of space since a relatively small amount of alcohol is needed to produce the alkylated product even though in the reaction zone there is a high mole ratio existing between the alcohol and the polymethylol condensate. The process of the present invention also makes it possible to produce certain alkylated polymethylol condensates which differ markedly from those of similar type heretofore produced. For example, in the production of alkylated polymethylol urea, it has been found that water-soluble alkylation products are obtainable wherein the methylol groups are substantially completely alkylated by means of either isopropanol or t-butanol. Heretofore, the alkylation products of polymethylol urea obtained with isopropanol or t-butanol have never been of sufficiently low molecular weight to be soluble in water.

The drawing is a somewhat diagrammatic elevation in cross-section illustrating one embodiment of apparatus or equipment adapted to carry out the process of the present invention. This equipment comprises a storage container or receptacle 3 having a discharge conduit or pipe 4 and means 5 for controlling the rate of discharge from the container 3. The container 3 may have a cover 6 to prevent entry of foreign material. The cover may be removable to facilitate the introduction of the reactant which may be termed broadly a polymethylol aminoplast condensate. Also, means 2 may be provided for controlling the temperature of the contents of vessel 3. This temperature-controlling means may take the form of a jacket to which a fluid heating or cooling medium may be introduced either by conduit 2a or 2b and removed, as by 2b or 2a.

Control means 5 may consist of a three-way valve by means of which the discharge of the reactant from the container 3 may be stopped completely or may be directed into either of two conduits or pipes 7 and 8 respectively. It is adapted to be adjusted to control the rate of flow into either of such conduits, or, if desired, additional separate regulating valves may be disposed in either or both of the pipes 7 and 8.

The pipes 7 and 8 discharge into a vessel 9 either directly (7) or, in the case of pipe 8, through a condenser 10. A cooling coil 11 is provided in the condenser and a cooling liquid such as cold water or brine may be introduced through the pipe 12 and discharged from the coil through the pipe 13. The condenser 10 is disposed above the vessel 9, but could as well be disposed within the upper portion of that vessel. The condenser serves to condense vapors of alcohol discharged from the top of the vessel 9 and returns the condensed alcohol into the vessel 9 where it is mixed with the polymethylol aminoplast condensate introduced through pipe 7. Alternatively, the polymethylol condensate may be mixed with the condensed alcohol within the condenser 10. Optionally, baffles 14 and 15 may be disposed within the upper portion of the vessel 9 to deflect separate streams or the mixed stream of the polymethylol condensate and alcohol and to facilitate their mixture within the vessel 9. The vessel 9 may also be provided in an upper portion thereof with other means for mixing the alcohol condensate and the polymethylol aminoplast. Such means may be in the form of an agitator or propellor device or it may be in the form of stationary beads or Raschig rings 16 of glass, porcelain, or of other material. When Raschig rings or glass beads or the like are employed, they may be supported on a suitable foraminous plate or screen 17 which is disposed above a body or mass of loose ion-exchange particles or beads 18 which in turn may be disposed upon a foraminous support 19 above the discharge conduit or outlet 20 in which there is provided means 21 for controlling the rate of discharge of the effluent containing the alkylated reaction product. A jacket 22 may be disposed about the portion of the vessel 9 in which the reaction occurs and this jacket may be supplied with a suitable cooling medium such as through a conduit 23 for entry thereof and a conduit 24 for discharge.

The discharge pipe 20 extends into the top of a vessel 25 which is adapted to receive the alkylated condensate discharged from the reaction vessel 9. The vessel 25 is provided with a discharge conduit or pipe 26 and valve means 27 for permitting withdrawal of the condensate when desired. Vessel 25 is also provided with means for heating it. Any suitable heating means may be provided such as a coil for steam or other heating liquid or vapor into the interior of the vessel 25 or it may, as shown, consist of a jacket 28 in which steam may be introduced as by pipe 29 and discharged through a suitable steam trap 30. The vessel 25 is closed except for the point of entry for the pipe 21 to introduce the alkylated condensate and the vapor conduit 31 which is connected at its upper end to the vessel 9 at a point 32 above the liquid level of reactants therein.

In operation, the desired proportion of alcohol is introduced into vessel 25. The polymethylol aminoplast condensate either in aqueous solution or in alcoholic medium is introduced into container 3. The vessel 25 is heated and the alcohol distillate passes through pipe 31 and upwardly into condenser 10 where it is condensed and refluxed into vessel 9. The valve 5 is then opened to discharge the polymethylol condensate from the receptacle 3 either through pipe 7 or through pipe 8 at such a rate as to provide the proper mole ratio such as from 8:1 to 35:1 between the alcohol condensed and the polymethylol condensate flowing into vessel 9. The alcohol and the polymethylol aminoplast mix and proceed through the bed of ion-exchange resin where alkylation occurs. To control the heat of reaction, a cooling medium is passed through the device 22 so as to prevent the temperature within the reaction zone from exceeding the boiling point of the alcohol. Desirably, this temperature is kept at least 2° C. below the boiling point of the alcohol and generally is kept at a temperature somewhere in the range of 50° C. to 125° C. The valve 21 is adjusted to discharge the alkylated product at essentially the same rate as the total rate of entry, at the top of the vessel 9, of alcohol condensate and polymethylol aminoplast. In the starting up of the system, valve 21 is closed and the discharge from container 3 is shut off until enough alcohol has distilled from the vessel 25 to raise the liquid level in vessel 9 to a point above the top of the ion-exchange resin and then the valve 5 is opened to provide the proper rate of flow of polymethylol condensate with respect to the rate of flow of alcohol condensate. Thereafter, when the liquid level within vessel 9 has risen to a level above the glass beads or Raschig rings 16, valve 21 is opened to a sufficient extent to allow the discharge of alkylated product at the same rate as the entry of the mixture of the alcohol condensate and polymethylol aminoplast into the top of the reaction vessel.

The polymethylol condensate can be introduced into vessel 3 continuously or intermittently at either regular or irregular periodic intervals so that the flow thereof through the reaction zone can continue without interruption indefinitely. Also, the alkylated product may be discharged from vessel 25 continuously at a controlled rate or intermittently at regular or at irregular intervals to avoid excessive filling of vessel 25 and pipe 31. If necessary, additional alcohol may occasionally be supplied to the system through the container 3.

The process of the present invention makes it possible to produce alkylated polymethylol aminoplast condensates with extremely low molecular weights and low viscosities and with the production of little or no insoluble gels. The process makes it possible to provide a large excess of alcohol relative to the polymethylol aminoplast in the reaction zone without producing a dilute product and without requiring the use of large vessels (9 and 25) which would normally be required when a large ratio of alcohol to polymethylol aminoplast is used in a batch process. In a typical operation in which a polymethylol urea is alkylated with methanol, a polymethylol urea obtained using a mole ratio of formaldehyde to urea of 4:1 and containing 14% water may be introduced into the storage vessel 39.

Assuming a batch of 6.25 gram-moles of polymethylol urea to be methylated in the system, using a mole ratio of 22:1 between the methanol and the polymethylol urea, there may be provided a vessel 25 having a capacity of 2.8 liters, a reaction chamber 9 having a capacity of 0.4 liter, and a storage vessel 3 having a capacity of 1.3 liters, the entire equipment therefore having a total capacity of about 4.5 liters. To carry out the same reaction using conventional procedures and a 22:1 mole ratio of methanol to polymethylol urea would require a vessel having a capacity of about 8.5 liters. Even larger savings in capacity and space are obtained with the process of the present invention when higher mole ratios of alcohol to polymethylol condensate are used in the reaction zone.

The product obtained by discharge from the vessel 25 through the valve 27 consists largely (at least 50% by weight) of dimethoxymethyluron and the balance of the condensate is of low molecular weight such as dimethoxymethylurea or trimethoxymethylurea, or mixtures thereof, and the content of uncombined alcohol may be from 25 to 60% by weight of the material discharged from the vessel 25. The product contains no salt obtained from the neutralization of an acid catalyst used in the alkylation step and it has the proper high solids content to be adapted for direct use or shipment as a concentrate.

The cation-exchange capacity of the ion-exchange resin is not in any way critical. For a given rate of throughput of the reactants, a resin having a relatively low exchange capacity is generally employed in larger amounts than a resin having a high capacity. The ion-exchange capacity may affect the size of the space within vessel 9 to be occupied by the resin or the rate at which the reactants are passed through the vessel. Obviously, for a given volume occupied by an ion-exchange resin, the rate of flow of reactants through the ion-exchange resin would have to be somewhat less when the ion-exchange resin has lower capacity. Generally, the rate of flow through the ion-exchange resin and the volume of the ion-exchange resin are so correlated as to provide a time of passage through the bed of resin of about one minute to 20 minutes when the ion-exchange resin is kept at a temperature of about 50° C. and the ion-exchange capacity of the resin is about 5 meq. per gram.

Any cation-exchange resin may be employed such as a sulfonated phenol-formaldehyde resin, a sulfonated styrene-divinyl benzene addition polymer, or a carboxylic acid ion-exchange resin such as an acrylic acid- or methacrylic acid-divinyl-benzene addition copolymer. All of the cation-exchange resins should be employed in the acid form. Generally, the sulfonic acid resins are preferred because of their stronger acidity. Ion-exchange resins having a high specific surface and correspondingly increased availability of ion-exchange sites which are disclosed in the United States patent application of Meitzner et al., Serial No. 749,526, filed July 18, 1958, may be used and the disclosure of that application is incorporated herein by reference.

The reaction product may be filtered to remove any insoluble condensation polymer produced during the alkylation. Thereafter, the filtrate may be subjected to a distillation at reduced pressure such as from 10 to 100 mm. of mercury absolute pressure to remove alcohol if further concentration is desired. Before this distillation, the pH of the reaction medium is adjusted by the addition of a suitable base to at least a value of 7 in the case of ureas or, in the case of aminotriazines, 9, and preferably to a value of 10 to 11. Any of the bases hereinabove mentioned for rendering the reaction medium alkaline prior to the methylolation may be employed at this stage. Again, the use of an amine or of a quaternary ammonium base is preferred to avoid the introduction of alkali metal salts for the reasons stated hereinabove.

The removal of alcohol and/or other solvent by distillation may be effected to provide any desired concentration such as from 50 to 90% solids, the solid material being essentially entirely the alkylated polymethylol aminoplast. During the concentration, a small haze or insoluble deposit may form. If so, this may be readily removed by filtration.

The alcohols employed for effecting the alkylation may have from 1 to 4 carbon atoms as mentioned hereinabove. For example, any of the following may be employed: methanol, ethanol, propanol, isopropanol, n-butanol, sec-butanol, t-butanol, or isobutanol. Allyl alcohol may also be used.

Of the aminotriazines, melamine itself is of the greatest importance; but the invention is applicable as well to such aminotriazines as benzoguanamine, acetoguanamine, their substitution products as well as the various substitution products of melamine particularly the alkyl, allyl, and β-hydroxyethyl substitution products containing from one to three allyl, β-hydroxyethyl, methyl, ethyl, or other lower $C_1$–$C_4$ alkyl groups on one or more of the amino nitrogen atoms in the melamine such as N,N-dimethylmelamine, N,N-diethylmelamine, N,N-di-n-propylmelamine, N,N-diisopropylmelamine, N,N-dihydroxyethylmelamine, and N,N-diallylmelamine.

The products obtained by the process of the present invention are adapted to be used in any fashion that such products have heretofore been employed. For example, they may be employed in the formation of coatings, clear or pigmented, on various substrates including paper, leather, textiles, metals, wood, resins, and so on. Advantageously, they may be admixed with other resins. For example, those condensates produced by the process of the present invention which are compatible with organic solvents, especially those alkylation products formed with alcohols having from 2 to 4 carbon atoms and particularly n-butyl alcohol, may be employed with organic solvent solutions of alkyd resins for application to any of the substrates just mentioned hereinabove. The water-soluble or compatible types, especially those formed with methanol as the alkylating agent, may be employed in conjunction with aqueous dispersions of water-insoluble emulsion polymers, especially those formed from the acids, esters, amides, or nitriles of acrylic acid or methacrylic acid and particularly the copolymers of such acrylic compounds, representative important members of which are the ethyl acrylate and methyl methacrylate polymers and copolymers.

In the following examples which are illustrative of the process of the present invention, the parts and percentages given are by weight unless otherwise specifically indicated.

EXAMPLE 1

A. *Preparation of Polymethylol Urea*

A mixture of 75 parts of urea, 7 parts of sodium hydroxide, and 1235 parts of a urea-formaldehyde condensate (85% solids in water) obtained from a mixture of formaldehyde and urea in a 5:1 mole ratio were charged to a glass reaction vessel equipped with an agitator and a reflux condenser and the mixture was heated with agitation on a steam bath for two hours.

B. *Alkylation*

To the reaction chamber 9 of the equipment shown in the drawing, there was charged a mixture of 170 parts of cation-exchange resin beads (in acid form) formed of a sulfonated divinylbenzene/styrene copolymer (as in Example 1 of United States Patent 2,366,007) and 60 parts of anion-exchange resin beads (in base form and containing about 40% moisture) formed of a divinylbenzene/styrene copolymer which has been chloromethylated and then aminated with an amine, such as methylamine (as in the United States Patent 2,591,574). Above this there was placed a 2-inch thick layer of glass beads. The condenser was continuously supplied with cold water at about 17° C. To the vessel 25, there was charged 1040 parts of methanol and reflux thereof was started (by heating vessel 25) and continued until the vessel 9 was filled above the level of the glass beads 16. The valve 21 was then adjusted to provide a flow of 30 parts per minute of alcohol and the reflux rate was adjusted to keep a constant level of alcohol above the glass beads 16. The polymethylol urea condensate obtained in part A was then charged to the vessel 3 and run into the reaction vessel 9 through pipe 8 over a period of 140 minutes. The alcohol to methylol condensate mole ratio in the reaction zone was 22.2:1. During this time air at room temperature was passed through jacket 22 to keep the temperature in the zone occupied by the ion-exchange resin below the boiling point of the methanol (at about 50° to 60° C.). Reflux was continued in vessel 25 for one-half hour in order to wash all product from the ion-exchange resin. The product in vessel 25 was then stripped completely of volatile materials under a vacuum of 0.5 mm. Hg at 30° C. The product, weighting 1020 parts, was water-soluble and had a viscosity of 3.7 poises at 25° C. It was found by distillation to contain 52% of N,N'-bis-methoxymethyluron.

EXAMPLE 2

Example 1 was repeated except that 1040 parts of ethanol was charged in place of the methanol in vessel 25. The alcohol to methylol condensate mole ratio in the reaction zone was 15.7:1. After stripping the product weighed 970 parts, was water-soluble, and had a viscosity of 46 poises at 25° C. It was found by distillation to contain 48% of N,N'-bis-ethoxy-methyluron.

EXAMPLE 3

Example 1 was repeated except that 1200 parts of isopropanol was charged in place of the methanol in vessel 25. The alcohol to methylol condensate mole ratio in the reaction zone was 12:1. After stripping off alcohol and water, 1010 parts of alkylated product was obtained. It was water-soluble and had a Gardner-Holdt viscosity of Z-9, well above 150 poises, at 25° C.

EXAMPLE 4

Example 1 was repeated except that 1920 parts of n-butanol was charged in place of the methanol in vessel 25. The alcohol to methylol condensate mole ratio in the reaction zone was 9.6:1. After stripping, the product weighed 1250 parts and had a viscosity of 4 poises at 25° C.

EXAMPLE 5

Example 1 was repeated except that 1920 parts of t-butanol was charged in place of the methanol in vessel 25. The alcohol to methylol condensate mole ratio in the reaction zone was 9.7:1. After stripping the product, 900 parts of a water-soluble gummy mass was obtained.

EXAMPLE 6

A. *Preparation of Polymethylol Melamine*

A mixture of 518 parts of n-butanol, 198 parts of paraformaldehyde, and 1.25 parts of triethylamine were heated at 110° C. for 20 minutes. The mixture was cooled to 95° C., 126 parts of melamine added, and the whole heated under reflux for 30 minutes.

B. *Alkylation*

To the reaction chamber, 9 of the drawing, there was charged 150 parts of a sulfonated styrene/divinylbenzene cation-exchange resin and above this there was placed a 1-inch thick layer of glass beads. To the vessel 25 there was charged 200 parts of n-butanol and 20 parts of triethanolamine. Vessel 25 was heated to reflux and heating was continued until the vessel 9 was filled above the level of the glass beads, 16. The valve 21 was then adjusted to provide a flow of 32 parts per minute of alcohol and the reflux rate was adjusted to keep a constant level of alcohol above the glass beads 16. The hot polymethylol melamine solution from part A was then charged to the storage vessel 3 where its temperature was maintained above 100° C. by means of the heating jacket 2. The hot polymethylol melamine was run into the reaction vessel 9 through pipe 7 over a period of one hour. The alcohol to methylol condensate mole ratio in the reaction zone was 32:1. Reflux was continued in 25 for one-half hour and then the product in vessel 25 was stripped under reduced pressure to 48% solids. It weighed 363 parts and had a viscosity of 1.45 poises at 25° C.

EXAMPLE 7

The procedure of Example 1B was applied for the methylation of dimethylol-N,N'-ethyleneurea. In this operation, the mixture of urea, sodium hydroxide, and urea-formaldehyde condensate in vessel 3 was replaced by 2900 parts of a mixture of dimethylol-N,N'-ethyleneurea and water in which the urea condensate was 50% by weight of the mixture. The mole ratio of the methanol to the dimethylol-N,N'ethyleneurea in the reaction zone was controlled to be about 8:1. A water-soluble methylated product was obtained.

EXAMPLE 8

The procedure of Example 6 (A and B) was repeated using 120 parts of paraformaldehyde, substituting 153 parts of acetoguanamine for the melamine, and adjusting the flow of the polymethylol acetoguanamine to provide a mole ratio of about 35:1 of the n-butanol to the polymethylol condensate in the reaction zone. A viscous butylated condensate was obtained.

EXAMPLE 9

The procedure of Example 6 (A and B) was repeated using 120 parts of paraformaldehyde, substituting 187 parts of benzoguanamine for the melamine, and adjusting the flow of the polymethylol benzoguanamine to provide a mole ratio of about 34:1 of the n-butanol to the polymethylol condensate in the reaction zone. A viscous butylated condensate was obtained.

EXAMPLE 10

The procedure of Example 6 (A and B) was repeated using 120 parts of paraformaldehyde, substituting 154 parts of N,N-dimethylmelamine for the melamine, and adjusting the flow of the polymethylol N,N-dimethylmelamine to provide a mole ratio of about 33:1 of the n-butanol to the polymethylol condensate in the reaction zone. A viscous butylated condensate was obtained.

It is to be understood that changes and variations may be made without departing from the spirit and scope of the invention as defined in the appended claim.

We claim:

A process of producing an alkylated urea-formaldehyde condensate which comprises continuously passing a mixture of t-butanol and a water-soluble condensate of formaldehyde with urea in which the mole ratio of t-butanol to the urea-formaldehyde condensate is between 8:1 and 35:1 through a reaction zone, maintained at a temperature between 40° and 125° C. and below the boiling point of the t-butanol, occupied by a body of particulate cation-exchange resin in acid form selected from the group consisting of sulfonated phenol-formaldehyde resins, sulfonated cross-linked vinyl addition copolymers, and cross-linked addition copolymers containing polymerized units of at least one acid selected from the group consisting of acrylic acid and methacrylic acid, continuously and concurrently distilling the t-butanol from the effluent discharged from the reaction zone, withdrawing the t-butylated urea-formaldehyde condensate from the distillation zone and continuously directing the distillate vapor to a condensing zone connected to the reaction zone for supplying the condensate directly thereto, feeding water-soluble urea-formaldehyde condensate continuously to the condensing zone for admixture with the distillate, and correlating the rate of feed of water-soluble urea-formaldehyde condensate with the rate of distilling to provide a predetermined mole ratio of the t-butanol to the polymethylol aminoplast between 8:1 and 35:1 and continuously discharging the resulting mixture to the reaction zone.

(References on following page)

References Cited in the file of this patent

UNITED STATES PATENTS

| | | |
|---|---|---|
| 2,368,451 | D'Alelio | Jan. 30, 1945 |
| 2,426,770 | Grim | Sept. 2, 1947 |
| 2,885,388 | Sallmann et al. | May 5, 1959 |

FOREIGN PATENTS

| | | |
|---|---|---|
| 158,677 | Australia | Sept. 8, 1954 |
| 577,735 | Great Britain | May 29, 1946 |
| 763,244 | Great Britain | Dec. 12, 1956 |
| 1,054,177 | France | Oct. 7, 1953 |

OTHER REFERENCES

Sussman: Ion Exchange Theory and Application, edited by Nachod, pages 265–272, Academic Press, New York (1949).

Nalco, Ion Exchange Bulletin (published by National Aluminate Corporation, Chicago, Ill.), pages 1 and 12 (December 1955).